United States Patent [19]

Lee

[11] Patent Number: 5,702,554
[45] Date of Patent: Dec. 30, 1997

[54] PROCESS OF LAMINATING GOLD FOIL AND GOLD FOIL CARD

[76] Inventor: Edmond Mun Hang Lee, Unit 2606-7, 26/F., Honour Industrial Center, 6, Sun Yip Street, Chai-Wan, Hong Kong

[21] Appl. No.: 583,210

[22] Filed: Jan. 4, 1996

[51] Int. Cl.$^6$ .................... B32B 15/08; B32B 31/20; B32B 31/22

[52] U.S. Cl. .................... 156/219; 156/290; 156/292; 156/308.4; 264/293; 428/76

[58] Field of Search .................... 156/219, 265, 156/308.4, 290, 292; 264/265, 284, 293; 428/76, 209, 332; 283/94, 107, 109, 904

[56] References Cited

U.S. PATENT DOCUMENTS

| | | | |
|---|---|---|---|
| 2,606,855 | 8/1952 | Jenkins | 156/219 |
| 2,763,893 | 9/1956 | Hall | 264/293 |
| 3,723,220 | 3/1973 | Scher | 156/219 |
| 4,250,135 | 2/1981 | Orsini | 264/284 |
| 4,401,499 | 8/1983 | Kaneko | 156/307.3 |
| 5,007,271 | 4/1991 | Boegli | 156/206 |
| 5,120,589 | 6/1992 | Morikawa | 428/76 |

*Primary Examiner*—Daniel Stemmer

*Attorney, Agent, or Firm*—David & Raymond; Raymond Y. C. Chan

[57] ABSTRACT

A process of laminating gold foil includes the steps of pressing a gold piece to form an elongated thin gold foil having an even thickness from 0.3 mm to 1 mm; cutting the gold foil to a plurality of gold foil pieces with predetermined size; placing each of the gold foil pieces between two plastic sanding mold sheets having a size larger than the gold foil piece, in which each of the two plastic sanding mold sheets has an interior sanded surface; pressing the two plastic sanding mold sheets onto the two surfaces of the gold foil piece so as to press the surfaces of the gold foil piece to form sanded surfaces; removing the sanded gold foil piece from the pair plastic sanding mold sheets and placing the sanded gold foil piece between two plastic laminating sheets having a size larger than the sanded gold foil piece; heating and pressing the two plastic laminating sheets with the sanded gold foil piece positioning there between, wherein the sanded surfaces of the sanded gold foil piece are integrally attached to the interior surfaces of the two plastic laminating sheets so as to form a rigid laminated gold foil card piece with transparent plastic coating on the two sanded surfaces of the sanded gold foil piece; and cutting the laminated gold foil card piece to remove the plastic fringe to form a gold foil card of predetermined shape and size.

4 Claims, 3 Drawing Sheets

5,702,554

1

PROCESS OF LAMINATING GOLD FOIL AND GOLD FOIL CARD

BACKGROUND OF THE PRESENT INVENTION

The present invention relates to a process of laminating gold foil to form a gold foil card, in which specific treatment and technical skill are applied to the manufacturing process thereby to enable transparent plastic laminating sheets integrally laminated upon a thin gold foil.

Laminating a paper with transparent laminating sheet by means of a conventional electric laminator to form a waterproof and rigid paper card is a well known prior art. By means of lamination, a paper can thus be sealed with waterproof, airtight durable plastic.

Since gold is one of the valuable metals, it is utilized as the raw material of various decorative and practical products. Even some credit cards are made in golden color in order to emphasize their noble value. Thus, it is valuable to develop the technique of manufacturing actual gold cards with relative low cost for those noble cards, such as golden credit card, VIP membership card, birthday card, and festival card, etc.

However, it is very difficult to print upon the surface of gold so that data such as the name of consumer and the card number are costly to be printed on a piece of pure gold. Besides, the magnetic tape of credit card is unable to attached onto a pure gold surface. Moreover, due to the soft nature of pure gold, a pure gold card is not durable. A solution of the above problems is discovered by the inventor of the present invention, which is to laminate a thin gold foil with plastic sheets as the lamination of papers, whereby to lower the cost of the gold card by using very thin and fight gold foil and enable the printing of data and the attachment of the magnetic tape upon the coating plastic surface. After a plurality of initial experiments, the following difficulties are encountered:

In order to reduce the cost as much as possible, the preferred thickness of the gold foil is from 0.1 mm to 1 mm which is similar to or even thinner than the thickness of a piece of paper. However, the thin gold foil unlikes the rigid papers which can remain flat during laminating. On the contrary, the thin and light gold foil may fold with wrinkles and roll up to form a coil which will make the laminating operation become difficult and cause air bubbles between the gold foil and the plastic coating sheet.

Besides, during the process of rolling a gold piece to form an elongated thin gold foil by means of rollers under predetermined pressure, the gold foil surfaces may be scratched to remain permanent scrapes thereon.

SUMMARY OF THE PRESENT INVENTION

The main object of the present invention is to provide a process of laminating gold foil which enables a soft and very thin gold foil with thickness less than 1 mm to be laminated with transparent plastic sheets on both sides to form gold foil card without air bubbles formed there between and scrapes formed on the gold foil surfaces.

Another object of the present invention is to provide a gold foil card manufacturing by a process of laminating gold foil, which coating plastic surfaces enable printing thereon easily and the attachment of the magnetic tape.

Another object of the present invention is to provide a gold foil card which comprises a gold foil laminated by plastic sheets on both surfaces and wherein the gold foil

2 surfaces and the coating plastic interior surfaces are able to integrally attach with each other without air bubbles formed there between.

Accordingly, a process of laminating gold foil includes the steps of pressing a gold piece to form an elongated thin gold foil having an even thickness from 0.1 mm to 1 mm; cutting the gold foil to a plurality of gold foil pieces with predetermined size; placing each of the gold foil pieces between two plastic rigid sanding mold sheets having a size larger than the gold foil piece, in which each of the two plastic sanding mold sheets has an interior sanded surface; pressing the two plastic sanding mold sheets onto the two surfaces of the gold foil piece thereby to press the surfaces of the gold foil piece to form sanded surfaces; removing the sanded gold foil piece from the pair plastic sanding mold sheets and placing the sanded gold foil piece between two plastic laminating sheets having a size larger than the sanded gold foil piece; heating and pressing the two plastic laminating sheets simultaneously with the sanded gold foil piece positioning them between, wherein the sanded surfaces of the sanded gold foil piece are integrally attached to the interior surfaces of the two plastic laminating sheets so as to form a rigid laminated gold foil card piece sealed with transparent plastic coating on the two sanded surfaces of the sanded gold foil piece; and cutting the laminated gold foil card piece to remove the plastic fringe to form a gold foil card of predetermined shape and size.

DETAILED DESCRIPTION OF THE PREFERRED EMBODIMENT

Figure 1:
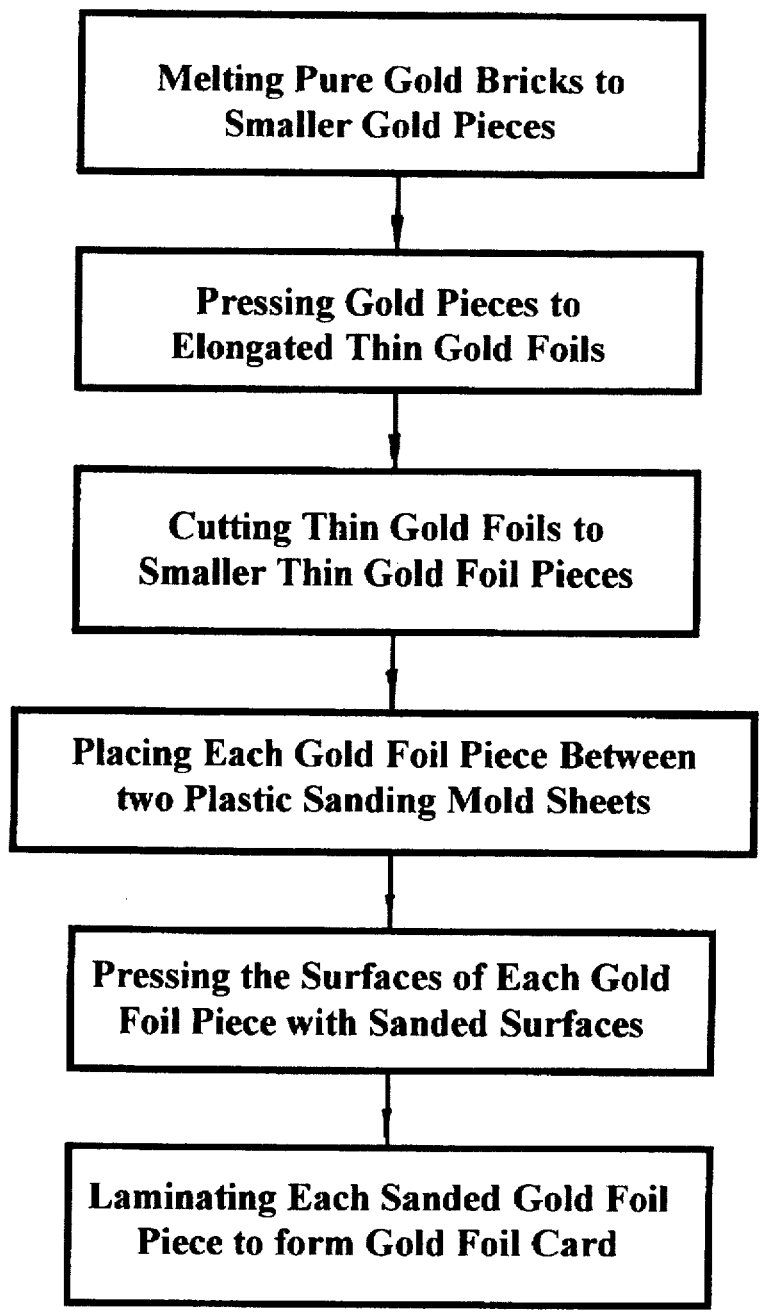
FIG. 1 is a block diagram of the present invention.
Figure 2:
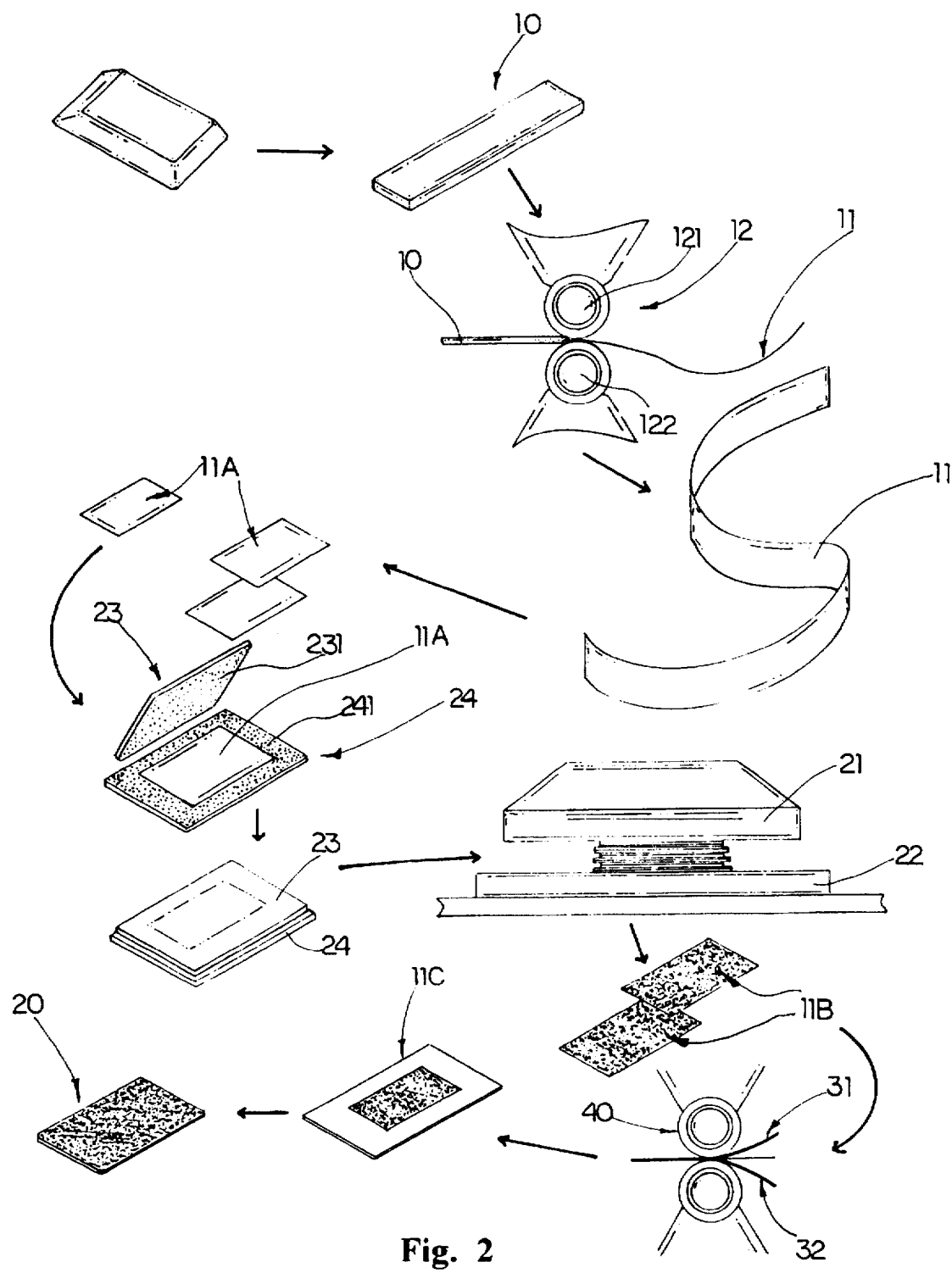
FIG. 2 is a perspective diagram of various steps of the process of laminating gold foil to form gold foil card according to the present invention.

Referring to FIGS. 1 and 2 of the drawings, a process of laminating gold foil according to the present invention comprises the following steps:

Melt 999.9 pure gold bricks or bars which are remolded to form a plurality of rectangular smaller gold pieces 10 with a thickness less than 1 cm.

Press the rectangular gold pieces 10 to form a plurality of elongated thinner gold foils 11 by means of a rolling machine 12 as shown in FIG. 2. The rolling machine 12 generally comprises two rollers 121, 122 parallelly aligned and driven to rotate in opposite direction so as to press the rectangular soft gold piece 10 to reduce its thickness. A predetermined thickness of the gold foil 11 can be gradually pressed by various rolling machines 12 with different gap distance between the two rollers 121 and 122.

Apply heat to the elongated thin gold foil 11 having a thickness more than 1 mm so as to soften its surfaces for feeding to another roller machine 12 with smaller gap distance. Thus, the thin gold foil 11 can be heated and pressed again and again by various rolling machines with gradually decreased gap distance until the average thickness of the elongated thin and soft gold foil 11 becomes 0.1 mm to 1 mm. Such thin gold foil 11 is utilized as the raw material of gold foil card, since the thinner the gold foil is used, the cost of the gold foil card according to the present invention can be minimized.

Since during the pressing step of the soft gold piece 10 to form the elongated thin gold foil 11 by the rollers 121, 122, the smooth and soft surfaces of the gold foil 11 will be unavoidably scratched by the steel made hard rollers 121, 122 to form some scrapes thereon. Such unwanted defective scrapes on the gold foil 11 surfaces must be eliminated before laminating with plastic coating. In addition, the smooth surfaces of the gold foil 11 is more difficult to laminate with the plastic laminating sheets than a rough surface. Thus, in order to enable the integral and firm attachment of the gold foil surfaces with the transparent plastic coating sheets, specific treatments must be applied to the process of the present invention as described hereafter.

The long and thin gold foil 11 is transversely cut to a plurality of small pieces 11a in card size or any desired size. Weight each thin gold foil piece 11a to ensure its individual weight and cost.

An even sanding effect on metal surface can be obtained by means of molding. A hydraulic press is used to drive a sanded mold surface of a steel mold onto the smooth metal surface which is lay on another steel static mold so as to press smooth metal surface to become sanded surface. As mentioned above, in order to reduce the cost, the gold foil piece 11a is pressed to have a thickness of 0.1 mm to 1 mm only, the conventional sanding method with steel mold is unable to apply to the thin gold foil piece 11a according to the present invention. It is because in order to evenly press the smooth surfaces of the thin gold foil piece 11a to become sanded surfaces, the distance between the sanded surfaces of the upper pressing mold and the lower static mold should be as close as possible, however, the steel molds may compact with each other and cause unwanted damage to the steel molds and/or the gold foil piece 11a. Moreover, due to the soft nature of the gold foil piece 11a, the hardness of the steel molds may deform the thin gold foil piece 11a instead of sanding its surfaces.

After a series of failure experiments, the above deforming problem of molding is solved by utilizing a pair of plastic pressing molds 21, 22 and a pair of plastic sanding mold sheets 23, 24. The gold foil piece 11a is first positioned between a pair of plastic sanding mold sheets 23, 24 which both have a size larger than the gold foil piece 11a and an interior sanded surface 231, 241 in contact with the upper and lower surfaces of the gold foil piece 11a respectively. Then the pair of plastic sanding mold sheets 23, 24 with the gold foil piece 11a there between are placed between said two rigid plastic mold 21, 22 on a hydraulic press. Due to the elastic and flexible nature of the plastic sanding mold sheets 23, 24, by driving the two plastic mold 21, 22 coaxially toward each other to press on the pair of plastic sanding mold sheets 23, 24, the pressing force applied thereto may evenly press the sanded interior surfaces 231, 241 onto the surfaces of the gold foil piece 11a so as to press the surfaces of the gold foil piece 11a to from the desired sanded surfaces 111, 112. The application of the upper and lower pressing plastic molds 21, 22 can prevent direct damage to the valuable steel molds of the hydraulic press by sudden enormous pressing and compact force.

The sanded gold foil piece 11b is then be withdrawn from the plastic sanding mold sheets 23, 24. At this stage, samples of sanded gold foil piece can be weight to ensure its individual weight, thickness and cost. The sanded surfaces 111, 112 of the gold foil 11b not only can eliminate any scrapes thereon but also can reinforce the thin and soft gold foil 11b for the laminating operation hereafter.

Place each of the sanded gold foil piece between two laminating plastic sheets 31, 32 having a size larger than the sanded gold foil piece 11b. Afterward, feed the laminating plastic sheets 31, 32 with the gold foil piece 11b there between into a laminating machine 40 in predetermined speed for applying heat of predetermined temperature to the coveting laminating plastic sheets 31, 32 for a specific period of time. The feeding speed, the laminating temperature and the pressure applied are depend on the total thickness of the plastic laminating sheets 31, 32 which is approximately the thickness of the gold foil card going to manufacture. The thicker the laminating sheets, the lower the feeding speed and the higher the laminating temperature are applied.

Due to the sanded surfaces 111, 112 formed on the gold foil piece 11b, the heated surfaces of the gold foil piece 11b and the laminating sheets 31, 32 can be pressed to firmly attached with each other without air bubbles formed there between by the laminating machine, and thus a rigid laminated gold foil card piece 11c is formed.

Figure 3:
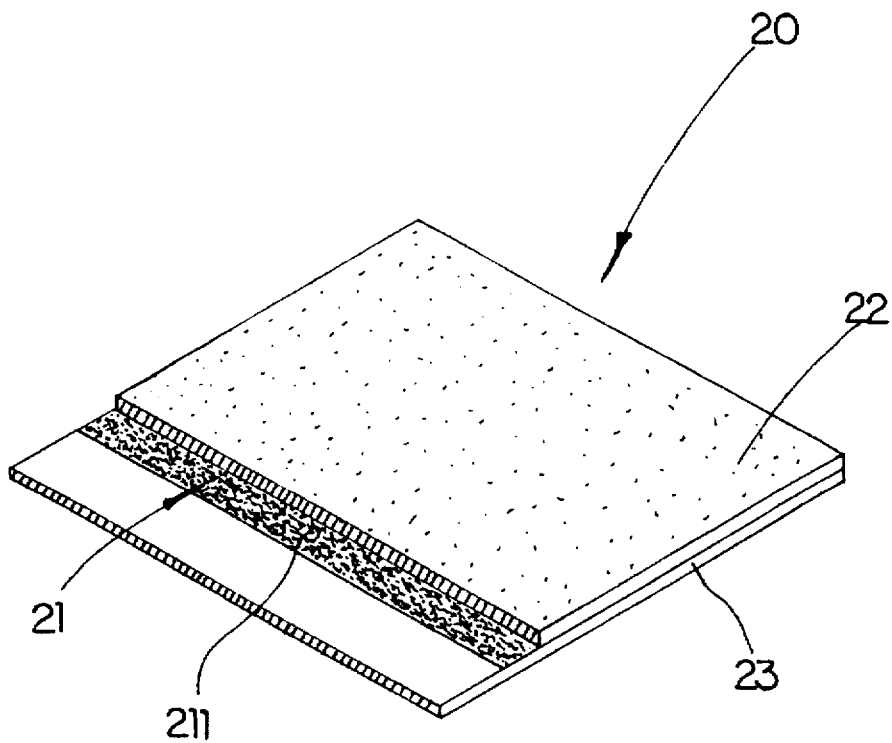
FIG. 3 is a sectional view of a laminated gold foil card of the present invention.

The laminated gold foil card piece 11c is cut to remove the plastic fringe and form a gold foil card 20, as shown in FIG. 3, of predetermined shape and size, such as a birthday card or credit card or any other desired shape and size.

Referring to FIG. 3, the laminated gold foil card 20 manufactured by the process of the present invention comprises a thin gold foil 21 with sanded surfaces 211, 212 having a thickness of 0.3 mm to 1 mm, and two coating transparent plastic sheets 22, 23 which interior surfaces are integrally attached to the two sanded surfaces 211, 212 of the gold foil 21.

Specific figures or wordings is able to print upon or press to protrude on the plastic surfaces of the coating transparent plastic sheets 22, 23 as the usual credit card or VIP membership card done. Furthermore, a magnetic tape is also able to attach on the plastic surfaces of the present invention.

I claim:

1. A process of laminating gold foil, comprising the following steps:

(a) pressing a gold piece to form an elongated thin gold foil having a thickness of 0.1 mm to 1 mm;

(b) cutting said elongated thin gold foil into a plurality of gold foil pieces of predetermined size;

(c) placing each of said gold foil pieces between a pair of plastic sanding mold sheets having a size larger than said gold foil piece, in which each of said two plastic sanding mold sheets has an interior sanded surface;

(d) pressing said two plastic sanding mold sheets onto the two surfaces of said gold foil piece respectively by pressing said two plastic sanding mold sheets toward each other, wherein said pair of plastic sanding mold sheets with said gold foil piece therebetween are placed between two plastic molds on a hydraulic press, and said two plastic molds coaxially are driven toward each other to press on said pair of plastic sanding mold sheets, the pressing force applied thereto presses said sanded interior surfaces evenly onto said two surfaces of said gold foil piece due to an elastic and flexible nature of said plastic sanding mold sheets to form two sanded surfaces respectively on said gold foil;

(e) removing said sanded gold foil piece from said pair of plastic sanding molding sheets and placing said sanded gold foil piece between two plastic laminating sheets having a size larger than said sanded gold foil piece;

(f) heating and pressing said two plastic laminating sheets with said sanded gold foil piece positioning therebetween simultaneously, wherein said sanded surfaces of said sanded gold foil piece are integrally attached to two interior surfaces of said two plastic laminating sheets so as to form a rigid laminated gold foil card piece with transparent plastic coating on said two sanded surfaces of said sanded gold foil piece;

(g) cutting said laminated gold foil card piece to remove a plastic fringe formed on the periphery thereof to form a gold foil card of predetermined shape and size; and (h) printing or pressing predetermined figures and wordings on at least one plastic surface of said laminated gold foil card.

2. A process of laminating gold foil, as recited in claim 1, further comprising the step of attaching a magnetic tape on at least one said plastic surface of said laminated gold foil card.

3. A process of laminating gold foil, as recited in claim 1, in which, in step (a), said elongated long and thin gold foil is pressed by two rotating rollers of a rolling machine, wherein said two rollers are aligned in parallel and driven to rotate in opposite direction so as to press said gold piece to reduce the thickness thereof.

4. A process of laminating gold foil, as recited in claim 2 in which, in step (a), said elongated long and thin gold foil is pressed by two rotating rollers of a rolling machine, wherein said two rollers are aligned in parallel and driven to rotate in opposite direction so as to press said gold piece to reduce the thickness thereof.

\* \* \* \* \*